Dec. 9, 1930.     G. J. BUDD     1,784,655
HARROW AND TOOTH THEREOF
Filed Aug. 29, 1927
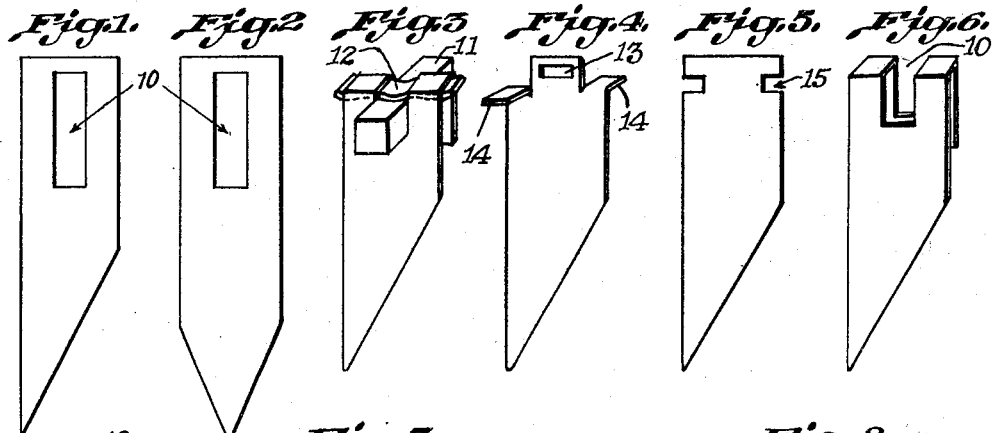
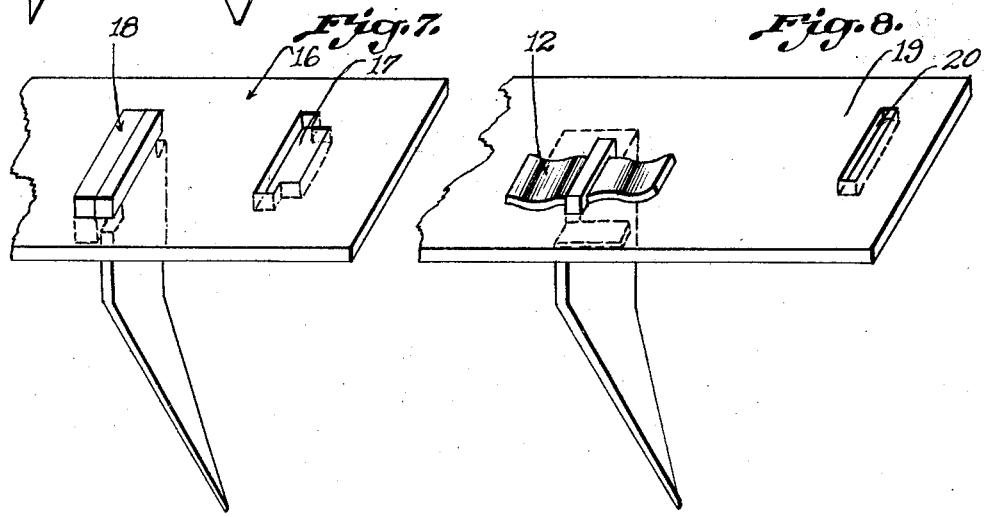
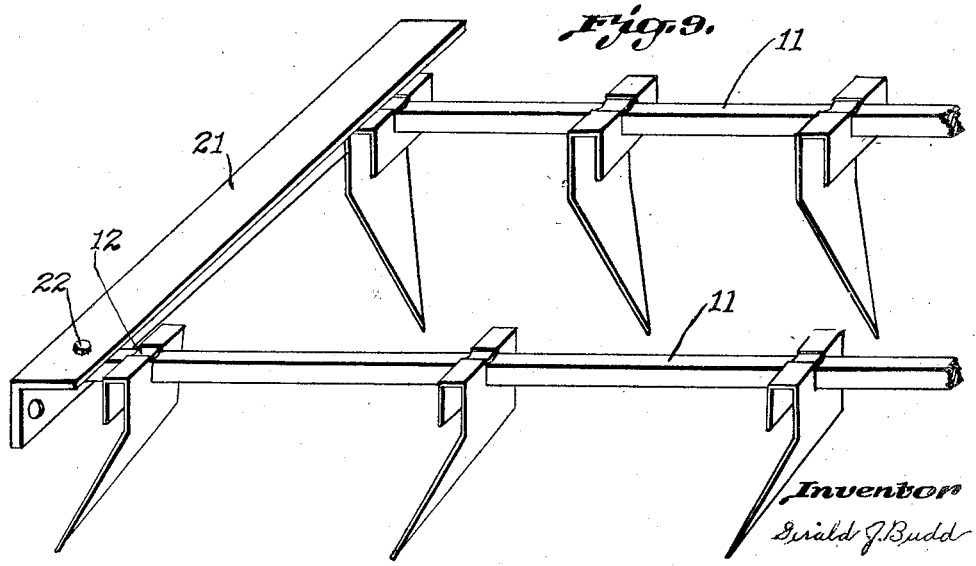
Inventor
Gerald J. Budd Patented Dec. 9, 1930

1,784,655

UNITED STATES PATENT OFFICE

GERALD J. BUDD, OF VENICE, CALIFORNIA

HARROW AND TOOTH THEREOF

Application filed August 29, 1927. Serial No. 216,131.

My invention particularly relates to the harrow tooth and the manner in which the same is secured in the tooth member of the frame, and the object thereof is to provide a harrow that will, to a large extent, exterminate small weeds and will pulverize the top soil to a greater extent than the harrows in common use.

In the drawings forming a part of this specification, Figs. 1, 2, 4, and 5 are face views of heavy flat metal blanks of different forms of harrow teeth. Fig. 3 is a perspective view of a tooth formed from a blank of Fig. 1 with a piece of holding bar therein. Fig. 6 is a perspective view of a completed tooth from a blank of Fig. 1. Fig. 7 is a perspective view of a fragment of a harrow with a tooth of Fig. 5 and a tooth aperture. Fig. 8 shows a fragment of a harrow with a tooth formed of a blank of Fig. 4 and a tooth aperture. Fig. 9 shows a fragment of a harrow with teeth formed of a blank of Fig. 1.

Referring to the drawings my improved harrow tooth is formed from heavy flat metal. In the top portion of the tooth blank of Figs. 1 and 2 is formed a rectangular aperture 10. This apertured portion is bent into U-shape as shown in Figs. 3, 6, and 9, and tooth bar 11 preferably square is laid in the aperture, extending across the shank at right angles thereto and the tooth is secured to the bar by a marcell or other wedge or key 12 which is passed under the top of the bent portion of the shank and over bar 11 as shown in Figs. 3 and 9 thereby securing the tooth upon the bar. At a short distance below bar 11 the tooth is bent either to the right or left slightly and below the bend the portion will be called the blade which preferably terminates in a point at one side as shown in Fig. 1 or in the center as shown in Fig. 2. The angle at which the blade bears to the shank is varied depending on the character of the work and the soil in which it is done. The tooth bars are secured to the transverse bars 21 by bolts 22 or other means and with them form the frame.

In Fig. 8 the tooth is the form of the blank of Fig. 4. The top portion of the shank has an aperture 13 therein and at each side the blank is slitted and the outer portions are turned at right angles to the face of the blank to form wings 14 one of which projects forwardly and one rearwardly. The apertured portion projects through the tooth member which may be a flat steel strip 19 and a wedge 12 is passed therethrough. In Fig. 7 the tooth is of the form of Fig. 5. The tooth member 16 has apertures 17 one side of which is as wide as the top of the shank and the other as wide as the shank at the notch. The shank is passed through the wider part until the notch 15 registers with the narrow part. The tooth is pushed into the narrow part and a key 18 is driven to hold it positioned.

By this construction it will be seen that in use the shank of the tooth is vertical and as the blade is angular to the shank it has a tendency to raise up the soil, pass underneath the same, and let it drop back, thereby cutting off the roots of the weeds and pulverizing the soil. It will also be seen that if any tooth becomes injured it can be quickly removed and a new tooth inserted in its place which can be done by unskilled labor. It will also be seen that the aperture and bent portion of the shank or the notches therein provide means that enable the tooth to be attached to the tooth bar or other holding means.

Having described my invention, I claim:

1. A harrow tooth formed of heavy flat metal the shank having an aperture therethrough and bent into U-shape at such aperture and the blade angularly disposed as to the shank and terminating in a point, in combination with a key, said key being adapted to pass through the U-shaped portion and above a portion of the frame member when passed through the U-shaped portion and thereby hold the tooth attached to the frame member.

2. In a harrow comprising tooth bars and transverse members secured to said bars; teeth of heavy flat metal having each a shank with an aperture therein and bent at said aperture and adapted to receive said bars in said apertures and having blades angular to said shanks, and terminating in points and keys adapted to pass through the bent portion of said shanks and over said bars and thereby lock the teeth to the bars.

3. Means for fastening a harrow tooth to a tooth-carrying member, comprising a shank on said tooth bent in inverted U-shape with an elongated aperture extending through the horizontal portion and part of each vertical portion of said inverted U, said tooth-carrying member being inserted through said aperture, and a wedge of wavelike shape inserted between said horizontal portion of said inverted U on one side of said aperture and said tooth-carrying member, thence over said tooth-carrying member, thence through the space between said tooth-carrying member and the horizontal portion of said inverted U on the other side of the said aperture, then further to extend beyond the edge of the said horizontal portion.

4. Means for fastening a harrow tooth to a tooth-carrying member, comprising a shank on said tooth bent in inverted U-shape with an elongated aperture extending through the horizontal portion and part of each vertical portion of said inverted U, said tooth-carrying member being inserted through said aperture, and a wedge of wavelike shape inserted betweeen said tooth-carrying member and said horizontal portion and extending outwardly beyond both edges of said horizontal portion.

5. A harrow tooth composed of heavy sheet metal having a U-shaped top portion having an aperture in the upper part, said aperture being adapted to receive therein a frame member with the top of the top portion projecting above the frame member when positioned for use, said tooth having a lower portion that projects angularly to the plane of the sides of the top portion.

6. A harrow tooth composed of heavy sheet metal formed into a shank and a blade, said shank being bent into an inverted U with an elongated aperture therein, said aperture being adapted to receive therein a frame member and to extend above the frame member and to receive a wedge above the frame member and below the top of the U-portion, said blade being bent at an angle to the plane of the sides of the shank.

7. A harrow tooth of plate metal composed of a shank and a blade, said blade being angular to the plane of the shank, said shank having its top portion bent and having a transverse aperture in said bent portion, said aperture being adapted to receive therein a frame member with the top of the bent portion projecting above the frame member when positioned for use, in combination with a key adapted to be passed under the top of the bent portion of the shank and over the frame member and thereby secure the tooth to the frame member.

In witness that I claim the foregoing I have hereunto subscribed my name this 23rd day of August 1927.

GERALD J. BUDD.